(No Model.)
W. G. AUSTIN.
CLUTCH.
No. 503,824. Patented Aug. 22, 1893.
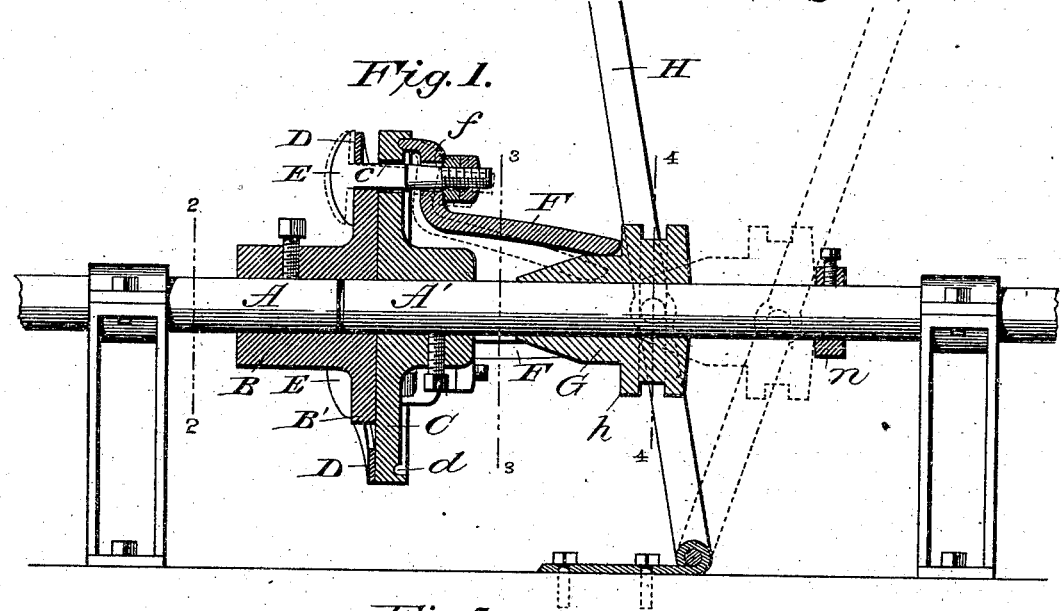
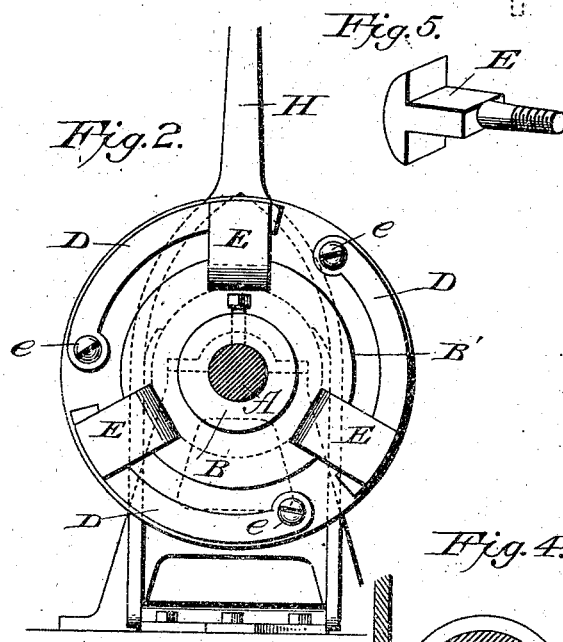
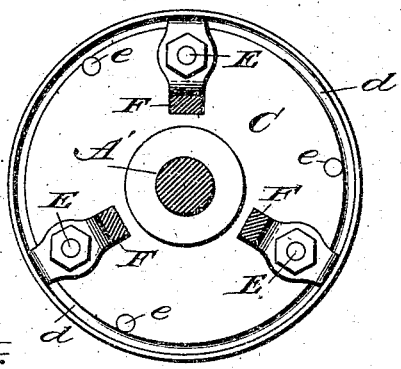
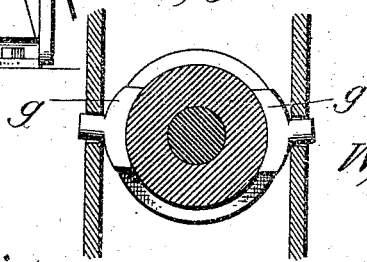
William G. Austin,
Inventor

UNITED STATES PATENT OFFICE.

WILLIAM G. AUSTIN, OF TARKIO, MISSOURI, ASSIGNOR OF THREE-FOURTHS TO SAMUEL RAINEY, JOSEPH C. CULBERTSON, AND NELSON AUSTIN, OF SAME PLACE.

CLUTCH.

SPECIFICATION forming part of Letters Patent No. 503,824, dated August 22, 1893.

Application filed June 1, 1893. Serial No. 476,210. (No model.)

*To all whom it may concern:*

Be it known that I, WILLIAM G. AUSTIN, a citizen of the United States of America, residing at Tarkio, in the county of Atchison and State of Missouri, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is to provide a friction clutch which is adapted to couple shafts so that they may rotate in unison or independently, and the device is also susceptible of use as a clutch pulley.

The invention consists in the construction and combination of the parts, as will be hereinafter fully set forth, and particularly pointed out in the claims.

In the accompanying drawings, forming part of this specification, Figure 1 is a sectional view showing a friction clutch constructed in accordance with my improvement. Fig. 2 is a sectional view on the line 2—2. Fig. 3 is a sectional view on the line 3—3. Fig. 4 is a sectional view on the line 4—4, and Fig. 5 is a detail view of one of the connecting bolts.

A and A' designate the shafts which are to be coupled by means of the friction clutch. When the device is used in connection with a pulley the rim forming the pulley will be attached to the part of the device carried by the shaft A.

B designates a collar, which is rigidly keyed to the shaft A and projects beyond the end of said shaft so that the shaft A' may have a bearing therein. The collar is provided at one end with a disk B', the face of which is plain or smooth, for the purpose hereinafter set forth.

Near the end of the shaft A' is keyed a disk C, said disk having a plain face opposite the plain face of the disk B'. This disk, C, is provided near its edge with apertures, $c$, and beyond said apertures with a marginal groove or recess $d$. The disk is also provided with perforations through which pass screws or securing bolts, $e$, for attaching the spring plates D D rigidly thereto, the free ends of said spring plates engaging with the heads of the bolts E E to hold them normally out of contact with the disk B'. The bolts E are provided with a rectangular portion which passes through the correspondingly shaped apertures $c$ in the disk C.

F F designate fulcrumed arms or levers, which are shaped as shown and are provided with apertures $f$ through which pass the reduced ends of the bolts E, and these fulcrumed arms or levers beyond the bolt aperture are provided with bearing ends which lie in the recess, or recesses, $d$. The long ends of the arms F are adapted to be engaged by a sleeve G which has a sliding movement upon the shaft A', the end of the sleeve which engages with the arms being conical to permit the arms to ride thereon. The sleeve is slid upon the shaft, to shift the same in and out of engagement with the arms, by means of a lever H, the lever being provided with members which extend on each side of the shaft and have pivoted thereto blocks $g\ g$, said blocks lying in a groove in the circumference of the sleeve so as to have a play therein when the lever is shifted from one position to the other. The lever is pivoted at one end in the usual manner, and the movement of the sleeve is limited in one direction by means of a collar, $n$, keyed upon the shaft, the opposite movement of the sleeve being limited by the arms F striking against a shoulder $h$ thereon.

The springs D D, hereinbefore referred to, have sufficient play to throw the fulcrumed arms in contact with the shaft A', when the sleeve is moved out of engagement with said arms. By providing springs of such strength the rattling of the parts is prevented.

To couple the two shafts it is only necessary to throw the lever H to one side, and said lever will carry with it the sleeve G the conical end of which will engage with the ends of the fulcrumed arms F and move them away from the shaft, which movement will cause said arms to draw upon the bolts E, the heads of which will bear against the disk B' and hold the plane face of the same in frictional contact with the plane face of the disk C, and thus cause the rotation of one shaft to rotate the other.

If necessary either one of the shafts may be permitted to have a slight longitudinal movement in its bearings.

The disk C may be provided with a rim sufficiently wide to permit the same being used as a pulley, and when the friction clutch hereinbefore described is used in connection with a pulley a continuous shaft may be employed.

This clutch or coupling will occupy but little space on the shaft, may be readily locked and unlocked, and can be started and stopped gradually without shock or jar.

The parts are so constructed that lubrication is only necessary on the sliding sleeve.

Having thus described my invention, what I claim as new, and desire to secure by Letters Patent, is—

1. In a friction clutch, the combination, with a disk B' mounted on a shaft as shown, of a disk C mounted on a shaft having a movable sleeve, bolts E E supported by the disk C springs attached to said disk, so as to bear upon the bolts and levers F F which are fulcrumed on the disk C and engage with the bolts, the free ends of said levers being engaged by the movable sleeve, substantially as shown, and for the purpose set forth.

2. In combination with the disks B' and C of different diameters, bolts E E carried by the larger disk so that the heads thereof will engage with the outer edge of the smaller disk, springs attached to the larger disk and bearing against the heads of the bolts, levers F through which the bolts pass the levers being fulcrumed adjacent to the periphery of the larger disk, and means for moving the levers and bolts against the action of the springs, substantially as shown, and for the purpose set forth.

3. In a clutch, a collar having a disk or flange B', a shaft carrying a disk C having rectangular apertures c, spring plates D attached to the disk C, bolts E E having rectangular portions and heads so constructed that they will engage with the flange or disk on the collar B and the springs attached to the disk C, arms F F fulcrumed on the bolts and provided with projecting portions which enter recesses in the disk C, said arms having rounded ends which are engaged by a conical sleeve, the parts being organized substantially as shown, and for the purpose set forth.

In testimony whereof I affix my signature in presence of two witnesses.

WILLIAM G. AUSTIN.

Witnesses:
R. M. STEVENSON,
W. B. SHELTERS.